United States Patent [19]

Rothmeyer

[11] Patent Number: 4,754,805
[45] Date of Patent: Jul. 5, 1988

[54] METHOD FOR TRANSFORMING THE TEMPERATURE OF HEAT AND HEAT TRANSFORMER

[76] Inventor: Markus Rothmeyer, Gleiwitzer Str. 28, 8058 Erding, Fed. Rep. of Germany

[21] Appl. No.: 707,665

[22] Filed: Mar. 4, 1985

[30] Foreign Application Priority Data

Mar. 6, 1984 [DE] Fed. Rep. of Germany ....... 3408192

[51] Int. Cl.$^4$ .......................... F25B 17/08; F24J 3/00; F28D 21/00
[52] U.S. Cl. .................................. 165/1; 165/104.12; 62/112; 62/480
[58] Field of Search ................. 165/104.12, 1; 62/480, 62/112

[56] References Cited

U.S. PATENT DOCUMENTS 4,410,028 10/1983 Alefeld et al. ................. 165/104.12

Primary Examiner—Albert W. Davis, Jr.

Attorney, Agent, or Firm—Hoffman & Baron

[57] ABSTRACT

A method for transforming heat to a higher temperature and a heat transformer. By supplying heat of intermediate temperature $T_1$ to a solid adsorbent at a low pressure, a previously adsorbed working fluid is desorbed from the solid adsorbent. The generated working fluid vapor is transformed to a liquid phase at a lower temperature $T_0$ while releasing the phase changed heat. At relatively high pressure, heat is supplied to a liquid phase of the working fluid, which is transformed to the gaseous phase, which is then adsorbed in a solid adsorbent while liberating the heat of adsorption. The process is continued by alternately regenerating/saturating the solid adsorbent. The use of an absorbent fluid for changing the phase of the working fluid allows higher output temperatures and choice of the pressure levels used. An internal heat exchange method is included for the efficient use of the sensible heat of the solid adsorbent in systems with two or more containers with solid adsorbent.

24 Claims, 7 Drawing Sheets

METHOD FOR TRANSFORMING THE TEMPERATURE OF HEAT AND HEAT TRANSFORMER

BACKGROUND OF THE INVENTION

This invention concerns methods for increasing the temperature of heat to a higher temperature level. The transformation of heat is accomplished by a sorption system in which a working fluid is desorbed from a solid adsorbent at an intermediate temperature $T_1$ and a relatively low working fluid pressure $p_0$. The generated working fluid vapor is transformed to a liquid phse at a lower temperature $T_0$ and the heat liberated in the phase change process is removed. The liquid phase of the working fluid is transformed to the gaseous phase at a higher working fluid pressure $p_{12}$ by heating it to an intermediate temperature $T_1'$. The generated gaseous working fluid is adsorbed in a solid adsorbent and the heat of adsorption is liberated at a higher temperature $T_2$. The process is repeated by switching the solid adsorbent from the adsorption to the desorption phase.

A heat transformer is a device which takes up heat at an intermediate temperature $T_1$ (e.g. industrial waste heat), transforms a portion of the heat to a higher temperature $T_2$ and release the remaining portion of the input heat at a lower temperature $T_0$. The operation of the system is sustained by the heat input at $T_2$ and electrical power is only required for auxilliary devices like liquid pumps or electrical controls.

The patent DE-PS No. 5796 57 describes a heat transformer which consists of an adsorption heat pump in which the directions of mass and heat flow are reversed. In this system an absorbent liquid (e.g. aqueous LiBr-solution) is used to absorb or generate working fluid vapor e.g. water vapor). The liquid absorbent with a high working fluid concentration is heated to an intermediate temperature $T_1$ in a generator and working fluid vapor is generated at a low working fluid vapor pressure $p_0$. The working fluid vapor is condensed in a condenser at a lower temperature $T_0$ and the heat of condensation is rejected to the ambient.

The condensed working fluid is pumped into an evaporator at a higher working fluid pressure $p_1$, where it is evaporated by the input of heat at an intermediate temperature $T_1'$. In a container, called absorbe, the working fluid vapor is adsorbed in said absorbent liquid, which is circulated from the generator to the absorber and back to the generator by mans of a second pump. The process is continued by supplying heat at $T_1$, removing heat at $T_2$ and $T_0$ and by the operation of the two pumps.

Further heat transformers are described in the patent DE Nos. 10 20 997, 25 54 937, 26 49 441, 26 35 557 and 27 27 990 as well as from the proceedings of the International Congress of Refrigeration in Paris 1983 (page 55 ff.). The heat transformer described in the latter publication uses an aqueous LiBr-solution. LiBr-solution as absorbent liquid with water as working fluid is restricted to temperatures below 160° C. since LiBr is very corrosive at higher temperatures and undergoes chemical reactions. Further the price of LiBr is rather high.

The same basic principle is used in an ammonia-water heat transformer, which is e.g. described in "Warmetransformator zur Prozesswarmeruckgewinnung aus Abwarme", Brauwelt (1983), p. 1508 ff. The use of ammonia-water is working fluid/absorbent combination limits the upper temperature of the process to 180° C., since ammonia dissociates at high temperatures. The ammonia pressure in the evaporator reaches 109 bar for an output temperature of 130° C. Further ammonia is poisonous, which limits the use of these systems (in conjunction with the high pressure) and increases the cost of such systems (due to safety equipment and very heavy tanks).

In a further system concentrated sulfuric acid is used as absorbent liquid. This system is described in the proceedings of the Int. Energy Conv Eng. Conference, Atlanta 1981, S. 926 ff. Despite the excellent results of such systems in the experimental stage the operation will be limited to special cases due to the dangers, handling problems and the corrosiveness of this combination.

A new development is the use of zeolite (a solid which is found as a mineral in volcanic rock or is produced synthetically) instead of a liquid absorbent in heat transformers.

A heat transformer using zeolite as solid adsorbent and water as working fluid is described in the German patent application DE-OS No. 30 22 284 (U.S. patent application No. 272,185). Since a solid adsorbent is used, the adsorbent cannot be pumped in a loop between the absorber and the generator as described above. Therefore a discontinuous operation is used: one or more containers filled with zeolite as solid adsorbent, these so-called adsorber-generators are alternately used as generator while supplying heat at an intermediate temperature $T_1$ at a low pressure $P_0$ and then used as adsorber to produce output heat at a higher temperature $T_2$ at a higher pressure $p_1$.

The solid adsorbent is cycled in temperature and pressure including the embedded heat exchangers and the container itself. This requires a certain minimum cycling time. The mass of adsorbent per adsorber/generator has to be large enough to provide output heat over one half cycle of the system. The cycling time has a lower bound due to the thermal masses involved and due to the high cost of additional heat exchanger area which is necessary for faster cycling. Therefore the mass of adsorbent required per adsorber/generator is quite large. An operation above 1 bar would require thickwalled pressure tanks. Below atmospheric pressure the adsorber/generators can be constructed as thinwalled containers with the solid adsorbent supporting. the sheet metal against th outside vapor pressure.

For economical reasons the pressure of solid adsorbent systems is limited to 1 bar. With water as working fluid this results in a maximum temperature of 100° C. in the evaporator of the above-described heat transformer. Additionally, the use of zeolites is limited to a pressure of about 2 bar water vapor pressure due to the poor stability of most zeolites at higher pressures.

The use of a zeolite heat transformer according to the patent application DE-OS No. 30 22 284 results in comparatively low efficiency (c.o.p.) since the sensible heat of the solid adsorbent plus the heat exchangers and the container has to be generated by valuable heat of adsorption during each adsorption cycle. After the adsorbent is saturated at the temperature $T_2$ and the working fluid pressure $p_1$ the sensible heat of container, heat exchanger and solid adsorbent is (irreversibly) used in the desorption process for the desorption of working fluid which is condensed at a low temperature. The sensible heat between $T_2$ and $T_1$ uses up a significant portion of the total available heat of adsorption.

SUMMARY OF THE INVENTION

The purpose of this invention is to extend the operating range of solid adsorbent heat transformers to higher temperature, that means to input temperatures of up to 160° and output temperatures up to about 200° C. This is to be reached without high pressures and with the use of non-poisonous materials. Further, the thermal efficiency for solid adsorbent heat pumps is to be optimized.

The improvements of the heat transformer cycle according to this patent application are reached by the use of adsorbent liquid(s) to lower the vapor pressure during adsorption and/or desorption of working fluid in the solid adsorbent and further by an efficient way to recover valuable heat of high temperature for preheating of the cooler adsorber/generator in systems with two or more adsorber/generators.

The working fluid vapor is desorbed (generated) by supplying heat to the solid adsorbent in an adsorber/generator at an intermediate temperature $T_1$ and at a working fluid pressure $p_0$. The generated working fluid vapor is absorbed ("resorbed") in a liquid absorbent in container called "resorber" which replaces the standard condenser). The heat of absorption is (in general) rejected to the ambient at low temperature $T_0$, e.g. by means of a cooling tower or using river water as coolant. The heat at temperature $T_1$ can be industrial waste heat.

For the production of output heat at a higher temperature $T_2$ the liquid absorbent is pumped from the resorber to a container call "desorber" which replaces the standard evaporator). It is heated to a temperature $T_1'$ and gives off working fluid vapor at a higher working fluid pressure $p_1$. The heat of desorption is again supplied (e.g. in the form of industrial waste heat at the intermediate temperature $T_1'$ (which does not have to be the same temperature as $T_1$, but must be higher than $T_0$ and lower than $T_2$). For simplicity it is in the following assumed that $T_1$ is approximately equal to $T_1'$. The working fluid vapor generated in the desorber is adsorbed in an adsorber/generator with low working fluid concentration (that means a freshly regenerated adsorber/generator). This adsorber/generator can either be the one that was just regenerated or a second adsorber/generator can be used simultaneously for adsorption while the first one is being regenerated. The preferred heat transformer system has at least two adsorber/generators to allow a quasi-continuous operation.

The heat of adsorption is partly used to heat the adsorber/generator from $T_1$ to $T_2$ and part of it is available as output heat at the temperature $T_2$. The output heat can be used e.g. in a chemical process or for steam production.

The systems described here can be used with a resorber+desorber, or one of the two components can be replaced by a condenser respectively an evaporator. The latter can be useful in cases where liquid absorbent streams are to be concentrated or diluted and are available as input to a single resorber or desorber without the corresponding desorber respectively resorber.

The use of an absorbent liquid in the heat transformer process results in two additional degrees of freedom: the concentration of working fluid in the liquid and the concentration change between the liquid supplied to the resorber and removed from the resorber (or desorber). These two degrees of freedom allow a better matching of the heat transformer process to the operating conditions. The most important parameter besides the cost of the installation) for the economic feasibility of the system is the heat output achieved per adsorption/desorption cycle. The choice of absorbent fluid and the two degrees of freedo can be used to maximize the concentration change between regenerated and saturated solid adsorbent. Certain zeolites (e.g. Mg-A) have pressures/temperature regions where their adsorption capacity is at a maximum.

Further one can reach a certain natural temperature span in the resorber or desorber which corresponds to the temperature change in a heat transfer medium and thus avoid so-called "pinch points" in the heat exchangers where the temperature difference between the two media becomes small and the heat exchange area is not utilized efficiently.

The application of the methods of internal heat exchange which are described in this application result in a higher c.o.p. of the heat transformer and in a higher capacity. The heat of the adsorber/generator with saturated adsorbent at the temperature $T_2$ is used to preheat and "pre-desorb" a second adsorber/generator.

Further details of the methods and devices of the present invention are discussed below and in the appended claims.

DETAILED DESCRIPTION OF THE DRAWINGS

Figure 1:
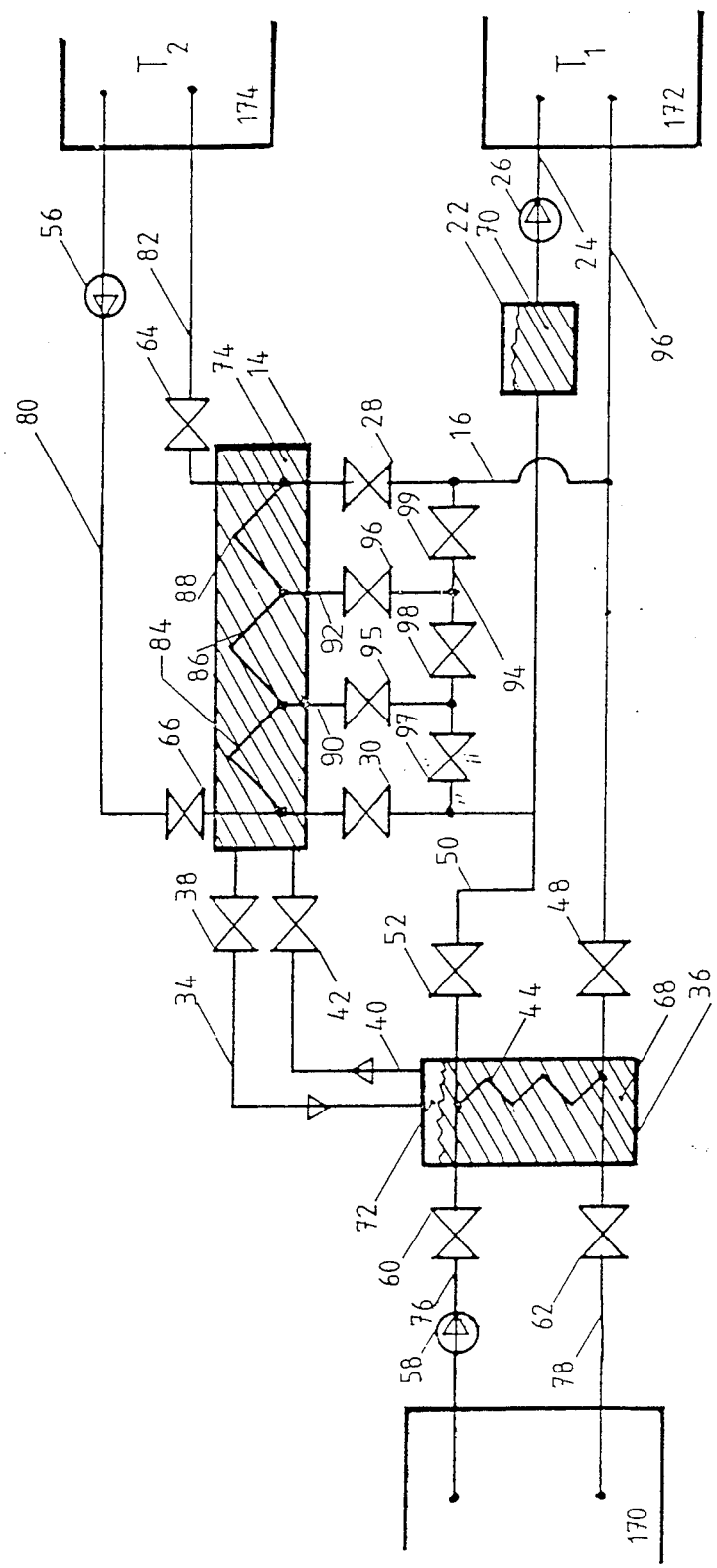
FIG. 1 Basic heat transformer with solid adsorbent using a single adsorber/generator (see DE-OS No. 30 22 284)

FIG. 1 shows a heat transformer (10) which operates discontinuously with only one adsorber/generator. The adsorber/generator is regenerated in the first phase and adsorbs in the second phase, the heat output phase.

The heat transformer (10) obtains the heat necessary for operation from a heat source (e.g. waste heat from a turbine, an engine or a chemical process).

The heat from the heat source (172) at temperature $T_1$ is supplied to the adsorber/generator (14) via a heat transfer loop. The heat is carried by a heat transfer fluid (it could also be supplied directly, e.g. by radiation in a solar collector).

The heat transfer loop consists of a pipe (16) from the heat source (172) to the adsorber/generator, a heat exchanger (18) in the adsorber/generator which is connected to a pipe (16), a pipe (20) from the heat exchanger element (18) to a storage container (22) and a return pipe (24) from the storage container to the heat source.

Advantageously a pump (26) is used in one of the pipes (16), (20) or (24) preferably in pipe (24). Further the heat exchange loop preferably includes a valve (30) downstream of the heat exchanger (18) in the pipe (20).

In case a gaseous heat transfer medium is used which is supplied through pipe (16) and which condenses in the heat exchanger element (18) or (44) the liquid phase is stored in container (22).

The pump (26) returns the liquid (70) from the tank (22) to the heat source (172) where it is again heated to the intermediate temperature $T_1$. In case of a heat transfer fluid without a phase change in the heat exchangers (18) or (44) the container (22) can be used as buffer for variations of the power output of the heat source (172). The heat exchanger elements can be pipes, plate heat exchangers, finned tubes or combinations with heat pipes.

The adsorber/generator (14) contains a solid adsorbent (74), advantageously a zeolite, and a working fluid (72), advantageously water. Via the heat exchanger element (18) the heat of the heat transfer medium is transferred to the solid adsorbent (74). As mentioned before, the adsorber/generator (14) contains a heat exchanger element (18) for the extraction of heat via a heat transfer medium. This heat exchanger element is connected to a heat sink (user) (174), which uses the heat which has been transformed to a higher temperature $t_2$.

The adsorber/generator (14) is connected to a feed pipe (34) for working fluid vapor (72) which connects to a resorber/desorber (36) and contains a valve (38). The resorber/desorber is further connected via an optional return pipe (40) with the adsorber/generator (14). The pipe (40) includes a valve (42).

The heat exchanger element (44) in the resorber/desorber is connected via the pipes (76) and (78) including the pump (58), and respectively the valves (60) and (62), with the heat sink (170).

Further, the heat exchanger element (44) is connected via the pipe (50) and a valve (52) with the pipe (20) downstream of the valve (30) and via the pipe (46) and the valve (48) with the pipe (16) upstream of the valve (28).

To divide the heat exchanger (18) into several sections the pipes (90) and (92) are connected to (18) such that three sections of the heat exchangers (84), (86) and (88) can be used. The valves (95) and (96) are used in the pipes (90) and (92) which connect to pipe (94). Pope (94) is connected with pipe (20) between the valve (28) and the valve (17) at the exit of the heat exchanger (18).

Between the connections of (20)/(94) and (90)/(94) a valve (97) is included. A valve (98) is used between the connections (94)/(90) and (94)/(92) and a valve (99) is used between the connections (94)/(92) an (94)/(16).

Both the resorber/desorber (36) and the adsorber/generator (14) are connected to the heat source (172) via a heat transfer loop. As will be described in the following, the resorber/desorber and the adsorber/generator are operated alternately, that means they are alternately connected to the heat transfer loop with intermediate temperature $T_1$ by appropriate use of the valves.

The resorber/desorber (36) contains an absorbent liquid (68), which contains a certain amount of working fluid. This absorbent fluid has the property to absorb working fluid at a relatively low temperature and low pressure and to generate (desorb) working fluid vapor at an intermediate temperature (which is largely determined by the heat transfer medium coming from the heat source (172) at a higher pressure.

Advantageously the absorbent liquid contains water as working fluid. For the preferred absorbent liquids the pressure of the absorbent is negligible compared to the working fluid pressure.

Advantageously, aqueous salt solutions are used as absorbent liquids. Preferred solutions are LiCl, LiBr and LiJ. For heat transformation up to $T_1 = 160°$ C. LiBr-solutions are preferred.

Further solutions of NaCl, $CaCl_2$ and ZnBr and mixtures of several of the preferred salt solutions can be used.

While the use of aqueous salt solutions is preferred, other, nonaqueous absorbent liquids can be used as well if they show a considerable vapor pressure reduction for the working fluid which is to be used. Also the absorbent liquid/working fluid combination has to be chemically stable.

As solid adsorbent zeolites with good stability t high temperatures and high vapor pressures are preferred, they should be cheap to produce and should adsorb large amounts of working per cycle. The zeolites of type A, X, Y are preferred because of their good stability. At high temperatures silicalite and ZSM-zeolites can be used. Very good stability with water as working fluid has been observed for magnesium exchanged A-type zeolites.

Further, any solid adsorbent with active internal adsorptive surfaces can be used, e.g. activated carbon, carbonized polymers, etc. These adsorbents are of special interest if organic working fluids like methanol are to be used The heat exchanger element (44) in the resorber/desorber (36) is further connected to a cooling device via the pipes (76) and (78). This device serves as heat sink and can be a cooling tower or a river.

The heat transformer (10) shown in FIG. 1 is operated in the following way: (the positions of the vales and the conditions of pumps, the temperatures and pressures are given in Table 1).

The process in which the working fluid is desorbed from the adsorber/generator (14) and absorbed in the resorber/generator (36) is called the generating phase. The adsorption phase is the process of adsorption in the solid adsorbent and desorption in the resorber/generator (36).

A heat transfer medium coing from the heat source (172) is used to supply the heat to the adsorber/generator (14) and generate working fluid vapor. During the generation of working fluid the valves (28) and (30) are open, the valves (64) and (66) are closed and the pump (26) is used for circulation of the heat transfer medium. The temperature of generation is $T_1$ and the working fluid pressure above the solid adsorbent is $p_0$.

The generated working fluid vapor is absorbed in a resorber/desorber (36) which is operating as resorber during this phase.

The generating phase is completed when the adsorber/generator is completely regenerated at the given temperature and pressure, (that means no more working fluid can be generated in the adsorber/generator (14)).

The working fluid is absorbed in the resorber (36) while developing heat at a relatively low temperature $T_0$. This heat (the heat of adsorption) is removed via a heat exchanger (44), e.g. by rejecting it to the ambient air.

Since the resorber/desorber (36) is kept at a low temperature $T_0$ by connecting it with the heat sink (170) via the heat exchanger (44) the working fluid pressure is reduced to $p_0$ in the system.

The preferred absorbent liquids in this process are salt solutions, which are used preferably in conjunction with water as working fluid. During the resorption process in the resorber the working fluid concentration in the absorbent liquid increases and the boiling point of the liquid decreases correspondingly.

During the desorption phase in the resorber/desorber (36), the temperature $T_1$ necessary to desorb water vapor changes accordingly. By using a relatively large amount of absorbent liquid the concentration change can be kept small. By choosing a certain concentrtion of working fluid in the absorbent liquid at given temperature $T_1$ a certain working fluid pressure is selected, which in turn determines the maximum temperature $T_2$ reached during the adsorption in the solid adsorbent.

The concentration of the absorbent liquid is either determined by the amounts of liquid and the cycling conditions or the concentration can be adjusted during the process by adding concentrated or diluted solutions during the process from storage tanks.

In order to desorb working fluid from the absorbent liquid in the resorber/desorber (36) the valves (60) and (62) and then the valves (28), (30) and (38) are closed, while the valves (42), (48) and (52) are opened.

The temperature of the absorbent liquid in the resorber/desorber is raised to the temperature $T_1$ of the heat source (172). Simultaneously the pressure in the resorber/desorber (36) and the adsorber/generator (14) rises to $p_1$.

The working fluid desorbed in the resorber/desorber (36) moves to the adsorber/generator via the pipe (40) and is adsorbed by the solid adsorbent. The process of adsorption liberates heat Q' which raises the temperature of the solid adsorbent to a temperature $T_2$ which is higher than the temperature $t_1$ of the input heat. The temperature $T_2$ depends mainly on the temperatures $T_0$ and $T_1$. The heat of adsorption is removed by a heat transfer loop using the heat exchanger (32) and is supplied to the user (174) at the temperature $T_2$. The process continues until the solid adsorbent is saturated with working fluid under the given conditions.

Table 1 shows an example of the attainable temperatures and pressures. If an aqueous salt solution, like LiBr-solution is used, the maximum temperatures are $T_1 = 160°$ C. at a pressure of 1 bar. The output temperatures can be as high as 200° C.

A special feature of the heat transformer is that pressure can be limited to 1 bar. That allows a construction of the adsorber/generators as light-weight containers. Expensive pressure tanks or safety devices are not necessary. Water as working fluid is cheap and does not present an environmental hazard (in contrast to many other working fluids).

The version of the heat transformer shown in FIG. 1 works discontinuously—as described above. The generation phase (resorption in the resorber/desorber (36)) is followed by the adsorption phase (desorption in the resorber/desorber) and then the cycle is repeated.

The device according to FIG. 1 can be used advantageously for the following preferred versions of the heat transformer:

a solid adsorbent and an absorbent liquid as resorption system in general with zeolite as solid adsorbent. Zeolites are aluminosilicates with crystalline structure and microscopic pores. The large internal surface area adsorbs gases and liquids while liberating the heat of adsorption. Zeolites can be dried (regenerated) by heating or by lowering the pressure.

Zeolites are promising adsorbents in heat transformer applications since they are cheap to produce, non-poisonous and envionmentally safe to use. Particularly well suited for heat transformer applications are the zeolites X and Y and because of the high thermal stability the types "ZSM" or "silicalite".

activated carbon as solid adsorbent, especially in combination with organic working fluids like methanol.

water as working fluid is preferred if zeolite is used as adsorbent. The combination zeolite-water yields high energy densities. The price, the environmental aspects and the availability of all necessary physical property data are further important advantages of water.

aqueous salt solutions as absorbent liquid in the resorber/desorber part. Aqueous salt solutions have been used in commercial air conditioning equipment for many years. The property data, the stability and chemical behavior are available.

LiBr, LiCl, $CaCl_2$, NaCl or ZnBr solutions as absorbent liquids. For changing the physical properties like vapor pressure, viscosity mixtures of the above salts can be used.

The resorption principle as means to reduce the pressure, especially for the utilization of cheap adsorbents which are not stable at higher pressures.

operation below 1 bar working fluid pressure. This allows the use of thin-walled adsorber/generators. The solid adsorbent is used to support the thin walls against the outside pressure. As a result of the weight and heat capacity of the containers can be minimized. This is of special importance for the heat transformer process, since the heat used to heat up the container diminishes the amount of output heat available at $T_2$. Further the cost of the containers is reduced compared to pressure vessels.

The use of the absorbent liquid to minimize the sorption capacity of the system by shifting the pressures of adsorption and desorption. The number of applicable solid adsorbents is limited, especially for high temperature applications. In many cases solid adsorbents have regions (in a pressure/temperature diagram) where the adsorption capacity is at a maximum per unit pressure or temperature. These regions are preferred for an adsorption cycle since the amount of working fluid adsorbed and desorbed in one cycle is at a maximum. If a heat transformer cycle with evaporation/condensation is used the preferred region directly determines the temperatures of operation (the vapor pressure of the condensation and evaporation is a function of temperature only). The use of a resorption system provides more degrees of freedom. By chosing a certain absorbent liquid and a certain concentration of this liquid the adsorption cycle can be shifted to the desired operating conditions where the adsorption capacity of the solid adsorbent is at a maximum. Thus the resorption cycle results in a higher output per unit mass of solid adsorbent.

a method which results in an efficient use of the solid adsorbent despite a pressure drop of the working fluid during operation of the heat transformer; large volumes of gaseous working fluid have to be moved through the adsorber/generator during adsorption/desorption, which results in a pressure gradient. The solid adsorbent adsorbs more working fluid at higher pressures. Therefore the highest temperatures are reached at the points of highest pressure. The output temperature of the heat transformer is therefore improved if the heat transfer medium (in the heat exchangers (18), (106), (108) flows in the direction opposite to the flow of working fluid.

The stream of gaseous working fluid entering the adsorber/generator with the temperature $T_1$ cools the adsorbent and eventually saturates it. The portion of the adsorbent close to the point where the working fluid enters the adsorber/generator is saturated first.

The above-described method is advantageously used with a heat exchanger which can be used in sections. Thus portions of the adsorber/generator can be used which are not saturated yet.

By operating the valves (95) to (99), (17), (21), (30), (28) the sections (84), (86), (88) can be used sequentially.

vacuum-tight systems without carrier gas. The presence of gases other than the working fluid slows down the rate of adsorption or desorption due to binary diffusion. For high power output and input it is advantageous to operate the heat transformer with working fluid, excluding other gases from the system by a vacuum tight design and an initial evacuation. Since small leaks are inevitable in large systems a device for removal of gases other than the working fluid should be included, preferentially connected to the resorber.

a method for operating the adsorber/generator (14) in sections by dividing the vapor space of the adsorber/generator by means of valves or flaps into different sections. The best use of the adsorbent can be made by saturating one section after the other and pumping the heat transfer fluid through the heat exchangers (84), (86), (88) such that it leaves the adsorber/generator at the end of a section which is subjected to the highest pressure (see above) and where said section was not yet used for heat extraction during the current half cycle. That means the heat transfer fluid leaves the adsorber/generator after flowing through an active portion of the adsorber/generator.

a simple device for the realization of the abovedescribed methods. The name adsorber/generator is used for a component which is alternately used as adsorber and generator, depending on the operating phase. The device for heat exchange (18) can be a conventional heat exchanger, like a flat plate heat exchanger, finned tubes, welded sheet metal plates with internal channels, or a pipe network with evaporation/recondensation as heat transfer mechanism. Also heat pipes can be used.

external heat exchangers. This allows the use of standard heat exchangers or the use of remote heat sources or sinks without using an intermediate heat transfer loop.

the use of so-called exchange columns, like the ones used in the chemical industry for extraction, rectification etc. This type of resorber/desorber is especially useful if the gaseous phase of the working fluid contains a volatile component of the absorbent liquid which is to be rectified before entering the adsorber/generator (14). The rectification is then accomplished in the upper portion of the exchange column while the lower portion acts as desorber.

Figure 2:
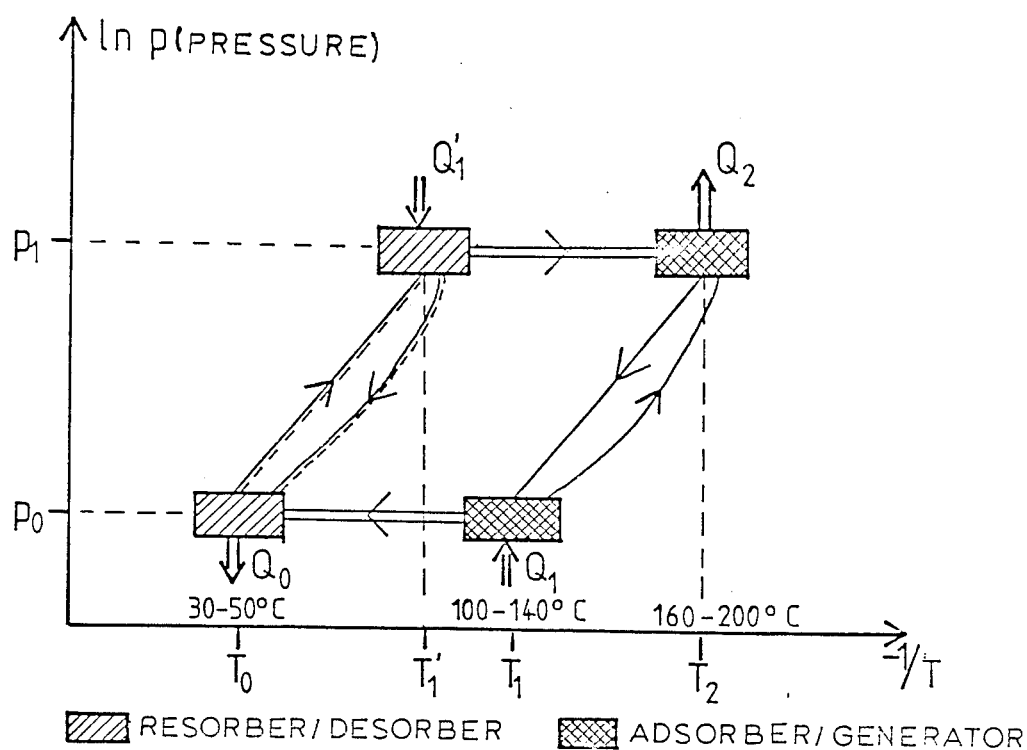
FIG. 2 Working fluid pressure and temperature for a resorption heat transformer

FIG. 2 shows the operating conditions of a sorption heat transformer in a temperature-pressure diagram.

By scaling the temperature axis in $1/T$ and the pressure in $\ln p$ the curves for the pressure of pure working fluid as well as for working fluid in contact with adsorbent at constant concentration reduce to straight lines.

The adsorbent is "dried" (regenerated) at an intermediate temperature $T_1$ using the heat $Q_1$. The generated working fluid moves (in the gaseous phase) to a resorber, where it is transformed to a liquid phase at a lower temperature $T_0$ and a lower pressure $p_0$ while liberating the heat $Q_0$.

Simultaneously or shifted in time working fluid is transformed from a liquid to the gaseous phase at an intermediate temperature $T_1'$ and at higher pressure $p_1$ while taking up the heat $Q_1'$. The generated working fluid vapor is adsorbed in an adsorbent at a higher tempertare $T_2$ and liberates the heat of sorption $Q_2$. When the sorption capacity of the adsorbent is exhausted the two adsorber/generators are interchanged and the process is started again. The liquid phase of the working fluid has to be moved from the container with lower pressure to the container with higher pressure.

If only one adsorber/generator and one container for changing the phase of the working fluid is used, they they both operate at the same pressure level, which changes from $p_0$ (regeneration) to $p_1$ (adsorption phase). Pressure and temperature correspond to FIG. 2. In this case, both the adsorber/generator and the container for changing the phase of the working fluid are cycled between two temperatures ($T_1$ and $T_2$, respectively $T_0$ and $T_1'$).

While the heat transformer according to FIG. 1 operates discontinuously with one adsorber/generator and one container for changing the phase of the working fluid, the following heat transformers are quasi-continuous systems which use two or more adsorber/generators and two containers for changing the phase of the working fluid, namely the resorber and desorber.

Figure 3:
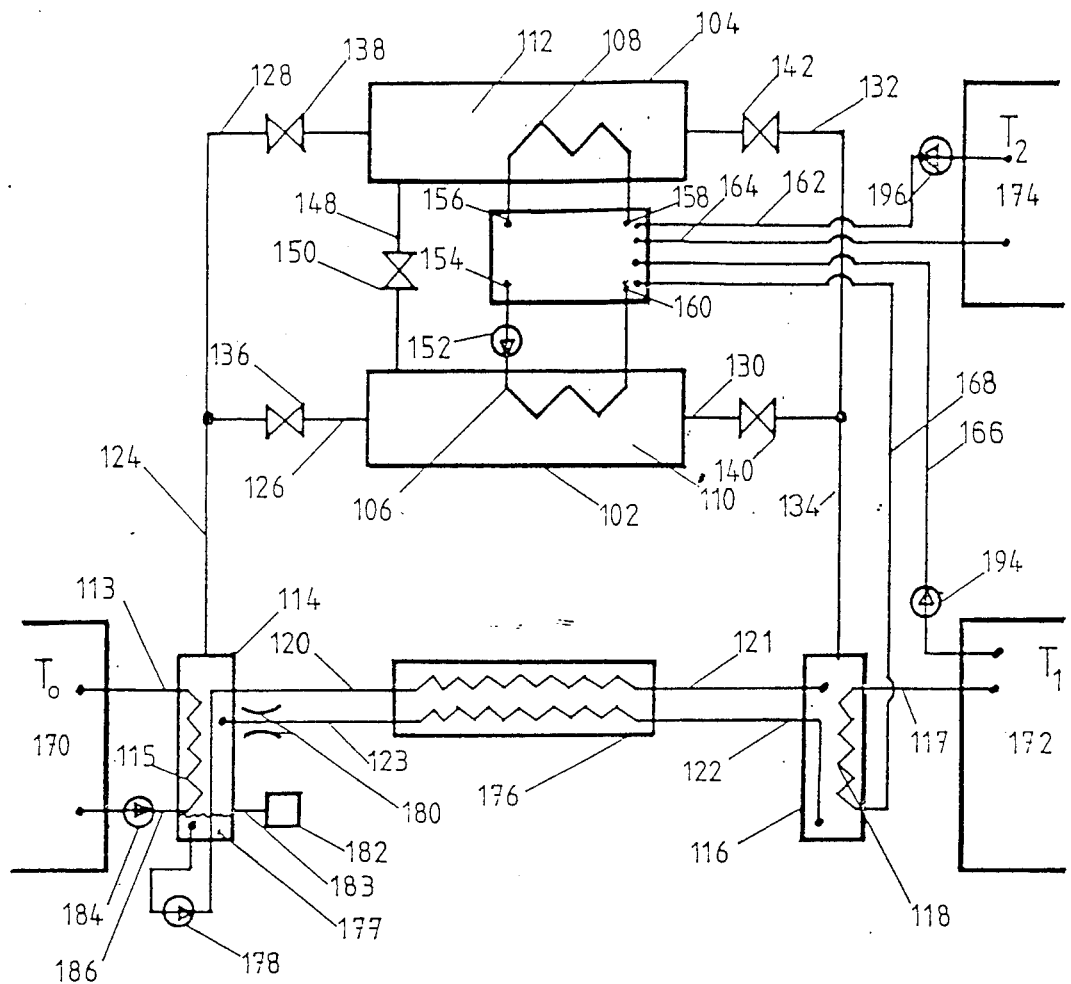
FIG. 3 Quasi-continuous heat transformer with two adsorber/generators which are used alternately as adsorber and generator FIG. 4 Quasi-continuous heat transformer as in FIG. 3 with additional solution heat exchanger and storage tanks for adsorbent liquid FIG. 5 Heat transformer with open (absorbent liquids entering and leaving the sorption containers, but operation under pure working fluid atmosphere) resorber and desorber FIG. 6 Heat transformer with open resorber, cooling tower and desorber with external heat exchanger FIG. 7 Pressure-temperature diagram for a heat transformer with two adsorber/generators. Working fluid pressure for zeolite as adsorbent and water as working fluid.

FIG. 3 shows a heat transformer (100), which operates quasi-continuously with two adsorber/generators (102) and (104).

The main components of the heat pump are the two adsorber/generators (102) and (104) with the heat exchanger (106) and (108) respectively, and a mass of adsorbent (110) and (112), respectively. The adsorber/generators are connected via the pipes (126) and (128) to the common duct (124) to the resorber (114). A second pair of pipes (130) and (132) connects the adsorber/generators (102) and (104) to a common duct (134) to the desorber (116).

Further, the heat transformer (100) includes the valves (138), (140), (142), (136) in the ducts ((128), (130), (132), (126)). The pipe from the valve arrangement (192) to the heat exchanger (106) contains a pump (152). The valve arrangement (192) is connected via the pipes (154), (156), (158), (160) with the heat exchanger (106) and (108) in the adsorber/generator (102) and (104). Further the valve arrangement (192) is connected via the pipes (162) and (164) with the high temperature ($T_2$) heat sink (174)(user) and via the pipes (166) and (168) with the heat source (172) at the temperature $T_1$.

Table 2 shows the connection matrix of the valve arrangement (192). The desorber incorporates a heat exchanger (118), which is connected via the pipe (168) to the valve arrangement (192). The other side of the heat exchanger (118) is connected via the return pipe (117) to the heat source (172). The resorber (114) incorporates a heat exchanger (115) which is connected via the pipe (186) with a pump (184) and via a second pipe (113) to a heat sink (170) e.g. a cooling tower.

The pipe (162) from the valve arrangement (192) to the heat sink (174) contains the pump (196).

The desorber (116) and the resorber (114) are connected via a loop for absorbent fluid (177), consisting of a pipe (120) from the resorber (114) to a solution heat exchanger (176) and a pipe (121) from (176) to the desorber (116), a pipe (122) for absorbent liquid with low working fluid concentration from the desorber (116) to the solution heat exchanger (176) and a pipe (123) with an expansion device (180) from (176) to the resorber (114). The preferred version includes a device (182) for the removal of gases other than the working gas, which is connected preferably to the resorber (114) via a pipe (183) desorber (116) to the solution heat exchanger (176) and a pipe (123) with an expansion device (180) from (176) to the resorber (114). The preferred version includes a device (182) for the removal of gases other than the working gas, which is connected preferably to the resorber (114) via a pipe (183).

For the operation of the heat transformer (100) the temperature levels $T_0$, $T_1$ and $T_2$ are necessary.

At the temperatures $T_0$ and $T_2$ heat is removed from the heat transformer. At the temperature $T_1$ heat (e.g. industrial waste heat) is supplied to the heat transformer by the heat source (172).

During operation the resorber (114) is cooled to a temperature $T_0$ by means of the heat sink 170 (cooling tower, e.g.) and the desorber (116) is heated to a temperature $T_1$ by the heat source (172). The absorbent liquid is heated in the desorber (116) and desorbs working fluid at an intermediate temperature and at a pressure $p_1$. The gaseous working fluid is adsorbed in one of the adsorber/generators (102), (104). The pipe (162) from the user (174) to the valve arrangement (192) includes a pump (196). The heat of adsorption is supplied to the user at higher temperature $T_2$ via the pipes (162) and (164).

A quasi-continuous operation is accomplished by interchanging the function of the two adsorber/generators periodically. One adsorber/generator is regenerated while the other one adsorbs. After saturation of the dsorbing adsorber/generator the function of (102) and (104) is interchanged. The former adsorber is now used as generator and vice versa. The pipes for the heat transfer medium are switched by means of the valve arrangement (192). Simultaneously the valves (136), (138), (140) and (142) are used to change the connections to the desorber (116) and resorber (114). At the end of the adsorption phase (step 1 in Table 1) the adsorber is at a high temperature $T_2$. To minimize the irreversibilities of the process an internal heat exchange is carried out before changing the function of the adsorber/generators (102) and (104).

During this internal heat exchange (step 2) heat is transferred from the hot adsorber/generator at (initially) $T_2$ to the second adsorber/generator which is initially at $T_1$. During ths step the heat source (172) and the heat user (174) disconnected from the heat exchangers ((108) and (106). The heat exchange is carried out via a heat transfer loop consisting of the heat exchangers (108), (106), the pump (152) and the connecting pipes. At the end of the internal heat transfer step both adsorber/generators (102) and (104) are at the same temperature $T_M$, which is between $T_1$ and $T_2$.

Advantageously, a further step (step 3) is included optimize the cycle: the adsorber/generators are connected via the pipe (148) and the pressure in the two adsorber/generators is allowed to equalize. During this process the heat exchangers (106) and (108) are inactive. The saturated adsorber/generator cools down during this step and gives off working fluid. The other adsorber/generator takes up said generated working fluid vapor and heats up due to the heat of adsorption. At the end of the prssure equalization step both adsorber/generators are at the same pressure. Now the process can be continued with adsrption in the previously regenerated adsorber/generator and regeneration in the other one.

In step 4 the adsorbing adsorber/generator heats up to the final temperature $T_2$ while the other adsorber/generator cools down to $T_1$ while desorbing working fluid.

Then the process can be continued with the phases 5, 6, 7, 8, which are the same as phases 1, 2, 3, 4 except that the function of the two adsorber/generators is interchanged.

In the heat transformer (100) the resorber (114) and desorber (116) are connected via a loop for absorbent liquid. Advantageously a heat exchanger (176) is included to transfer heat from the hot liquid with low working fluid concentration coming from the desorber to the liquid with high working fluid concentration coming from the resorber.

FIG. 3 shows a preferred connection of the heat source connections (dashed lines).

The heat transfer medium coming from the heat source (172) supplied heat to the adsorber/generator (102) or (104) and then to the desorber (116) is lower than the temperature $T_1$ of the heat source (172). Since most absorbent liquids show a relatively poor thermal stability, this is to be preferred, especially for high temperature applications. The absorbent liquid is in this case subjected to the lowest possible temperatures. The heat transfer medium is cooled to a lower temperature than with a parallel operation of the desorber and the adsorber/generator. A lower temperature of the returning heat transfer fluid means a higher exergetic efficiency of the cycle.

In special cases, where the output of the heat source is available at no cost it can be advantageous to use the parallel operation as shown by the dotted lines in FIG. 3.

Figure 7:
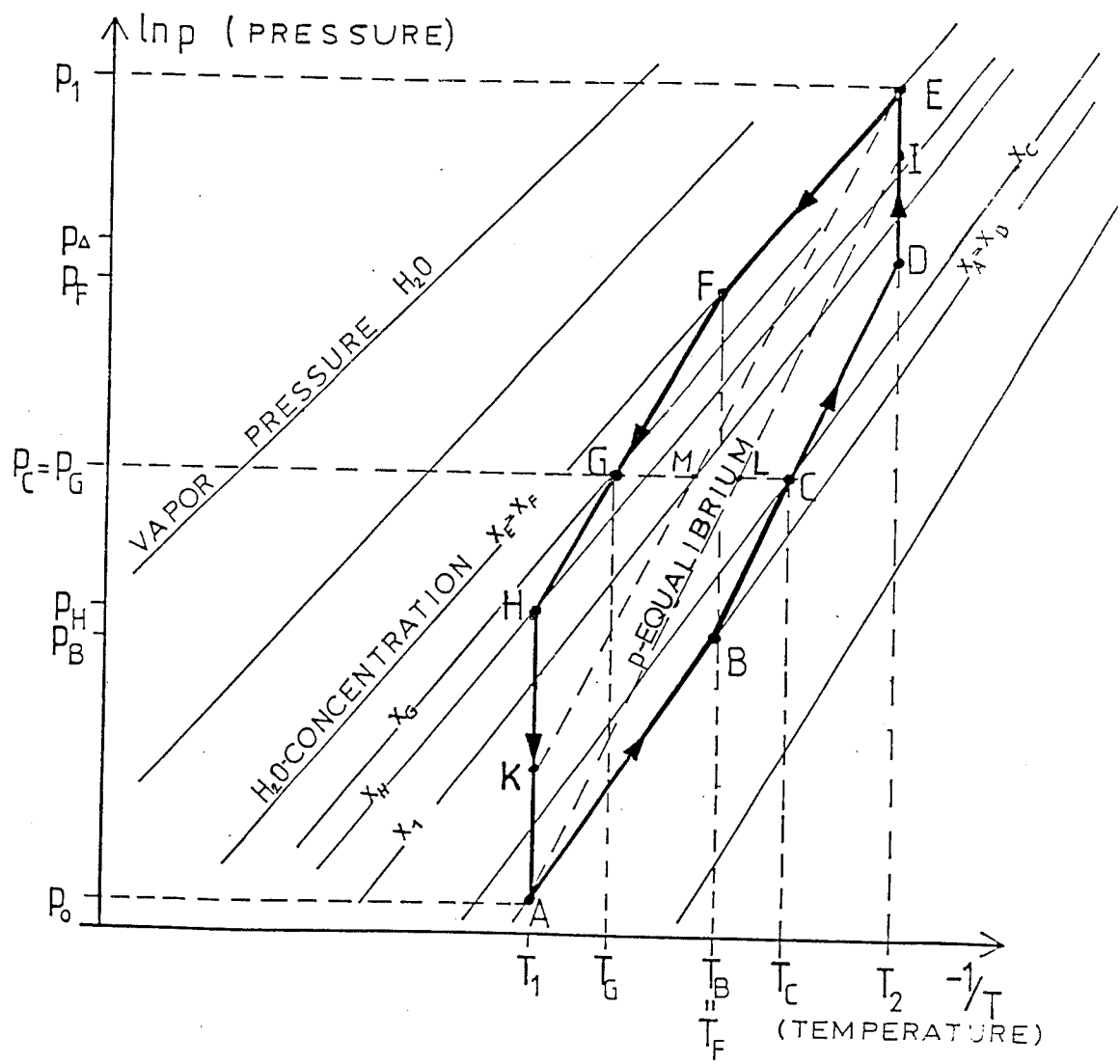

The following methods and devices concern the heat transformer especially as shown in FIG. 3. The preferred methods and devices are:

a heat transformer (100) with several adsorber/generators. If the heat output at a temperature $T_2$ has to be quasi-continuous at least two adsorber/generators are necessary. If heat has to be supplied during the internal heat exchange period then 4 adsorber/generators should be used. Then the valve arrangement (192) has to be expanded for 4 adsorber/generators. The 4 adsorber/generators undergo the same sequence as in the case of only 2.

the internal heat exchange between two adsorber/generators (102), (104) by means of a heat transfer medium shall flow through the adsorber/generators (102), (104) such that th resulting temperature differences are small. This is accomplished by connecting the hotter end of the heat exchanger (106)/(108) with the hotter end of heat exchanger (108)/(106) and at a direction of flow of the heat transfer medium from the cooler end to the hotter end in the hotter adsorber/generator.

a method for pressure equalization between the two adsorber/generators (102). (104). During this step the desorber and resorber are inactive (in a system with 2 adsorber/genertors). The valves (136), (138), (140), (142) are closed and the heat exchangers (106), (108) are inactive.

a combination of the two above-described methods: first the internal heat echange is carried out and then the pressure equalization step. This procedure is shown in FIG. 7 in detail.

the case that the adsorber/generator I (which is heating up during the pressure equalization step) reaches the output temperature $T_2$ during this step and/or the second adsorber/generator II cools down to the temperature $T_1$ during this srep. In that case, output heat can be obtained from adsorber/generator I without supplying heat at the souce temperature $T_1$. If the temperature in the second adsorber/generator falls below the temperature $T_1$ then heat of the heat source (172) can be used to regenerate the adsorber/generator II partly while adsorbing the generated vapor in the other adsorber generator (I). As soon as the pressure of the two adsorber/-genertors is equal the process stops. The cycle is then continued by the regular adsorption respectively regeneration phase in adsorber/generator I, respectively II.

Without the described procedure the amount of working fluid transferred from II to I during the pressure equalization step would have to be moved to the resorber (114) where the latent heat is released at a low temperature $T_0$. Instead the latent heat is available at a high temperature $T_2$ with the abovedescribed method.

a heat transformer with more than two adsorber/generators. In this case, two adsorber/generators are in the adsorption and generation phase, while the other adsorber/generators are in the internal heat exchange phases. After cmpleting the adsorption phase the function of the adsorber/generators is changed and the next phase is started. All adsorber/generators go through the different phases in the same sequence. If four adsorber/-generators are used each of the phases 1-2-3-4 is used in one adsorber/generator at any time. (the phases 5-6-7-8 are equivalent to 1-2-3-4 and therefore not considered to be new phases).

a device for exchanging heat between the adsorber/-generators (102) and (104). During the internal heat exchange this device transports the sensible heat of the hotter adsorbr/generator to the other adsorber/generator. Prefrred is the use of the heat exchangers (106) and (108) together with a pump (152) and the pies (154), (156), (158), (160). The switching between of the connections of the heat exchangers is performed with a valve arrangement (192) (see Table 2).

a heat transformer with separate desorber (116) and resorber (114). This permits a continuous use of the desorber and resorber if several adsorber/generators are used.

a solution heat exchanger 176) for the exchange of heat between the hot adsorbent liquid which is coming from the desorber at low working fluid concentration and the cool, absorbent liquid leaving the resorber with high working fluid concentration. To circulate the liqud a pump (178) is used.

a heat transformer with adsorber/generators which incorporate a resorber. This design results in very low pressure drops between the solid adsorbent and the resorber. Since the resorption takes place at low vapor pressure the voume of the working fluid vapor moing from the adsorbent to the resorber is large, which results in a significant pressure drop. If the resorber is inorprated in the adsorber/generator and the valves (138) and (136) are eliminated then the absorbent liquid has to be drained during the desorption phase. Otherwise the working fluid coming from the desorber would heat up the absorbent liquid in the resorber.

a device for switching the connections of the heat exchangers 106) and (108) between the heat source (172) and the heat sink (user) (174) and for connecting (106) and (108) during the internal heat exchange. The function of this valve arrangement is described in able 2. The valve arrangement can consist of separate valves or of a special multi-function vale.

a device (180) for reducing the pressure in the pipe between the desorber (116) and the resorber (114), preferably in pipe (123). This device can be a throttle, a capillary or a turbine to recover the energy of expansion, e.g. to drive the pump (178).

Starting with the heat transformer according to FIG. 3 the device shown in FIG. 4 follows by adding several improvements which are described in the following. Components which are used for the same purposes and are not principally different have been labelled with the same numbers in FIGS. 3 and 4.

A storage tank (202) for absorbent liquid is connected via the pipes (223) and (221) which include the valves (224) and (220), respectively, to the pipe (121) from the solution heat exchanger (176) to the resorber (114). Between the connections of (223) and (221) the pipe (121) includes a valve (222). A further storage tank is connected to the pipe (123) upstream and downstream of a valve (208). The connecting pipes (225) and (227) include the valves (206) and (204). Preferred are storage tanks (202) and (240) with heat exchangers (203) and (241), respectively. With the heat exchanger (203) the storage tank 202) can be preheated to a temperature available from a waste heat source, e.g. (172). The second tank (240) can be cooled with (241) to a lower temperature e.g. using the heat sink (170).

If a volatile absorbent liquid is used, the process can be improved by including a rectifier (226) in the pipe (122). The rectifier is cooled with a heat exchanger element (228) which can be connected to heat sink which is at a temperature below $T_1$.

Further improvements are the regulating valves (242), (244), and (212) which can be used to regulate the temperatures (and therefore the pressure levels and the heat output) in the heat transformer. The heat exchanger elements (248) and (210) in the desorber, respectively the resorber, can be included to improve the heat exchange in the resorption loop. Further, the heat exchanger (214) can be used to recover part of the heat of the superheated (not saturated) vapor coming from the adsorber/generator which is entering the resorber. This heat is used to preheat the absorbent liquid flowing from the resorber (114) to the desorber (116). With the regulating valve (217) a portion of liquid circulated through the heat exchanger element (216) in (214) is such that the optimum amount of heat is recovered.

Figure 4:
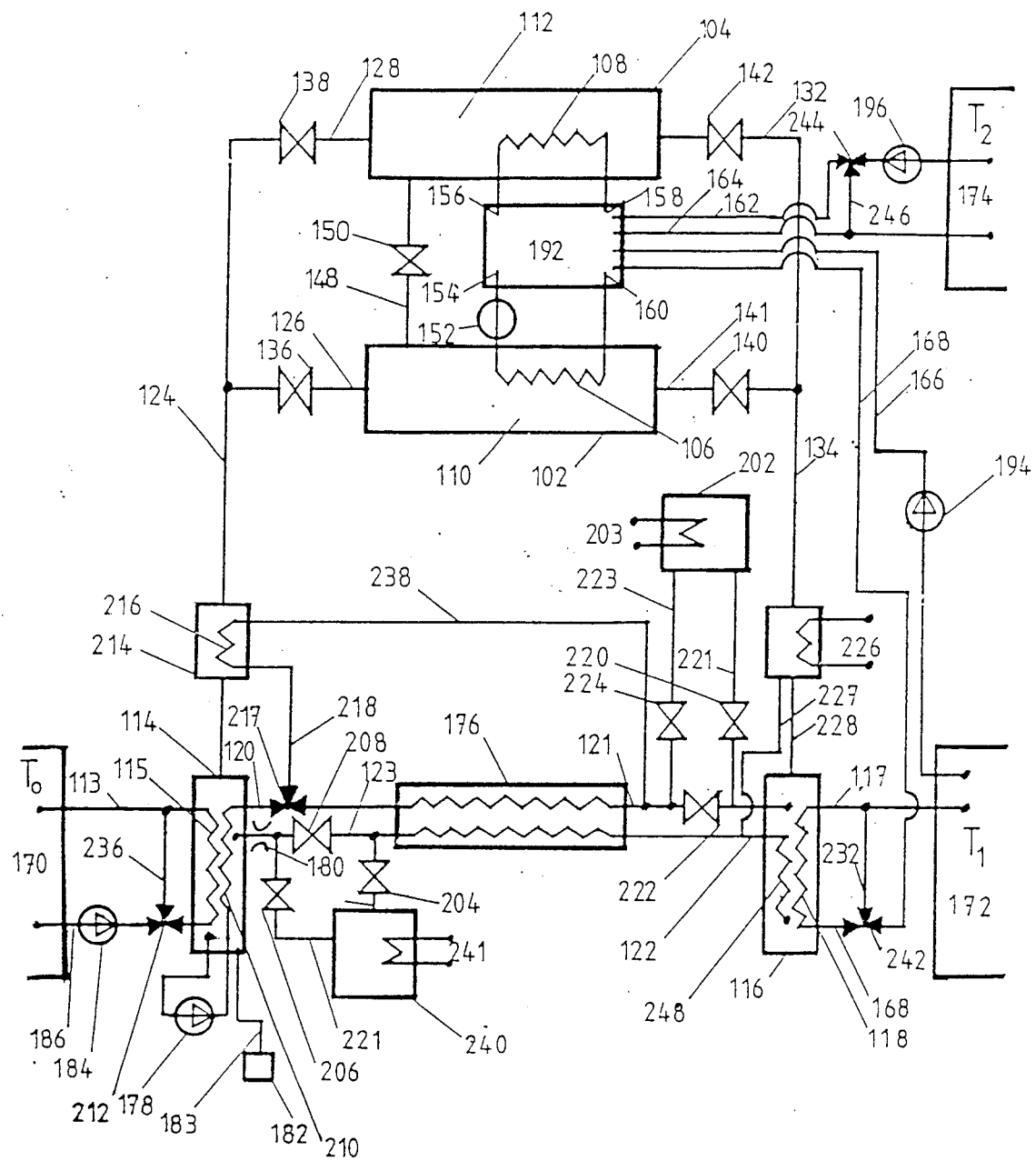

The system shown in FIG. 4 allows a more efficient use of the input energy. The preferred versions are:

a heat transformer where the storage tanks (202) and (240) are used for storing absorbent liquid such that the system can (within limits) be used as heat storage device. Using absorbent liquid at a temperature $T_1$ from the tank (202) and a freshly regenerated adsorber/generator, the heat transformer can supply output heat for some time without heat input (until all stored absorbent liquid is used up in tank (202) or the adsorber/generator is saturated.

a method to regulate the heat transformer without the use of regulating valves in the gas flow. The amount of working fluid desorbed in the desorber (116) is regulated mainly by adjusting the temperature of the desorber.

regulation of the adsorber/generator power with the regulating valve (244). This valve is necessary since the temperatures reached during the beginning of the adsorption phase are very high. The valve (244) by-passes part of the heat transfer medium to reach a constant temperature of the output heat.

regulation of the resorber (114). This is advantageous if the temperature of the heat source (172) varies considerably. Using the valve (212) a constant temperature or a certain heat output in the adsorber/generator can be reached. A low temperature is the desorber gives a lower pressure and thus reduces the output of the heat transformer.

regulation of the resorber temperature. This is useful if the temperature of the heat sink changes and/or if the absorbent liquid must not be cooled below a certain crystallization temperature.

regulation of the desorber temperature. The output power depends on the amount of working fluid vapor adsorbed per unit time. The amount of working fluid produced in the desorber (116) can be regulated by changing the temperature of the absorbent liquid in the desorber via the regulating valve (242).

the use of heat exchangers (210) and (248) in the resorber (114) and the desorber (116). This principle is sometimes used in absorption heat pumps with liquid absorbent and improves the efficiency of heat exchange in the resorption loop. The absorbent liquid with low working fluid concentration is pre-cooled in the heat exchanger (210) in the resorber before it is pumped into the resorption space of the resorber (114).

Similarly, the absorbent liquid with high working fluid concentration is preheated in the heat exchanger element (248) before entering the desorption space of the desorber (116).

a device to empty the resorber of absorbent liquid. This is used in conjunction with the integrated resorber—adsorber/generator. The absorbent liquid can be drained or pumped to the storage tank (202). Further the absorbent liquid level can be changed during operation of the resorber (114) to regulate the resorber power.

Figure 5:
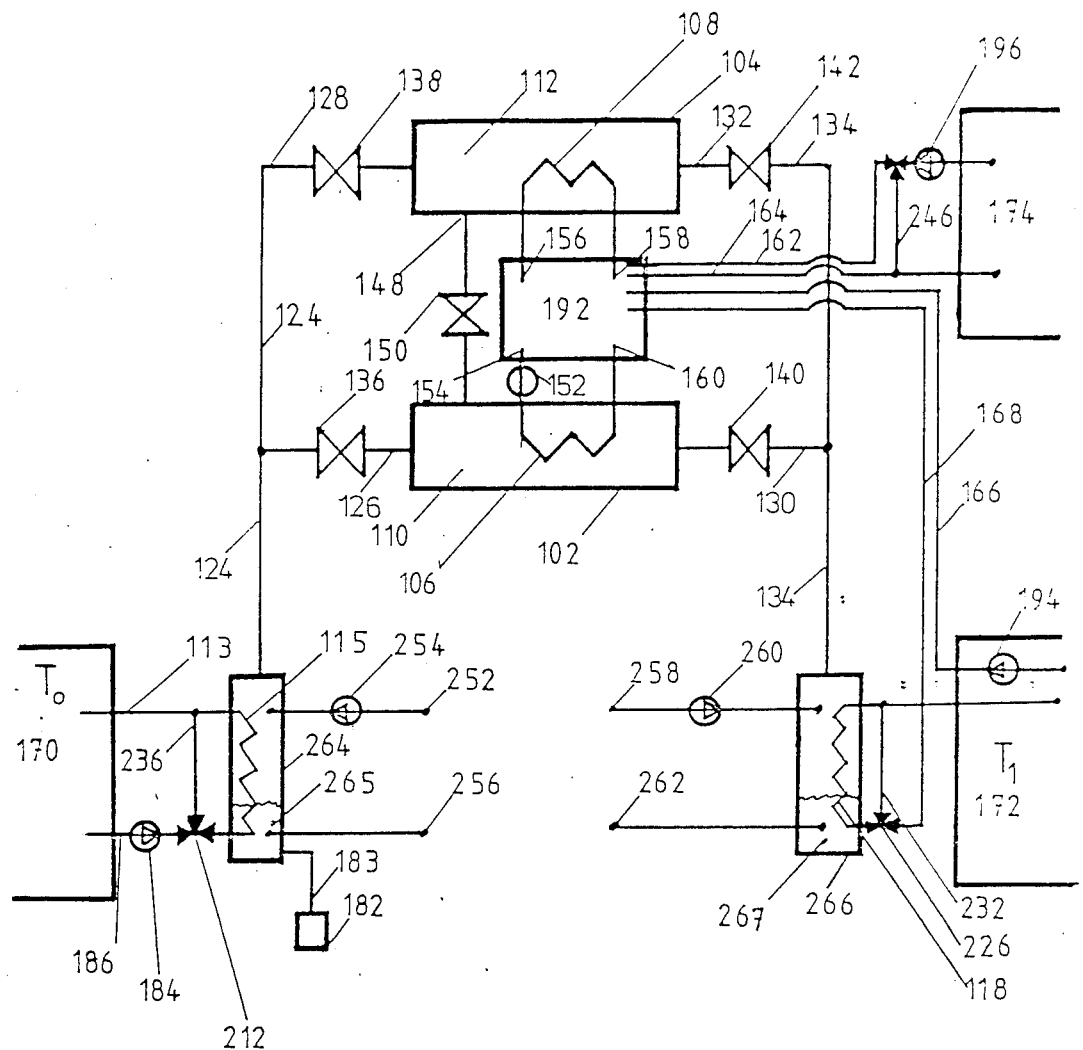

FIG. 5 shows a heat transformer (300), which uses a resorber (264) and a desorber (266) with independent absorbent liquid streams.

The absorbent liquid with high working fluid concentration flow through pipe (258) with the regulating valve (259) into the desorber (266). The drain pipe (262) includes a pump (254). If the desorber is operated above one bar the components (259) and (260) are interchanged.

The resorber (264) is supplied with absorbent liquid via a pipe (252) with a regulating valve (255). The drain pipe (256) includes a pump (254). The rest of FIG. 5 corresponds to FIGS. 3 and 4.

The heat transformer (300) in FIG. 5 allows the simultaneous use as a heat transformer and as a device for concentrating or diluting liquids. It can also be used with only one absorbent liquid, while the second resorption/desorption process is replaced by a condensation/evaporation process.

For example, a heat transformer of this kind can be used with sea water in the desorber (266) The sea water is concentrated in the desorber (266) and leaves the desorber as concentrated brine. The desorbed water is adsorbed in the solid adsorbent (112), or 110) and moves to the resorber in the subsequent generating phase.

In this case, the resorber (264) can be operated as condenser, without an absorbent liquid. The condensed water is pure and can be used as tap water. The concentrated brine can be used to produce salt. Simultaneously the system (300) has transformed heat from a temperature $T_1$ to a higher temperature $T_2$.

Similar processes can be used for concentrating or diluting, or for distilling and separating components of fluids. The most important restriction for the use is the compatibility of the working fluid and the solid adsorbent.

Figure 6:
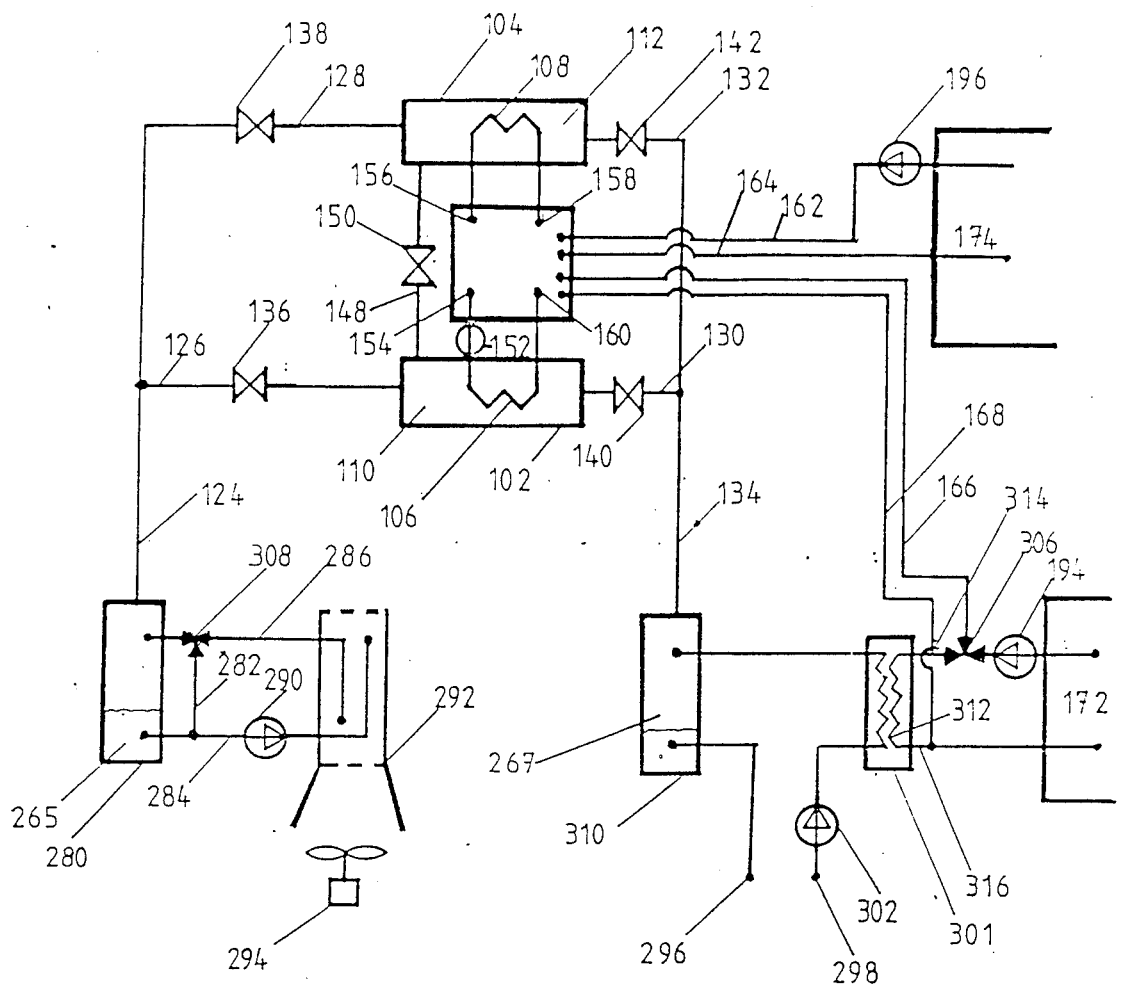

FIG. 6 shows a simple heat transformer with a resorber (280) and a desorber (310). The resorber is cooled by a heat transfer loop to an open cooling tower. The desorber (310) is supplied with absorbent liquid with the temperature $T_1$ from an external heat exchanger (301).

The resorber 114 (the component which serves as a sink for gaseous working fluid and) of FIG. 3 is replaced by a simplified version 280 in FIG. 6. The simplified resorber is a container in which the gaseous working fluid coming from the adsorber-generator 104 or 102 is adsorbed in a fluid 265. This adsorbent fluid is pumped in a partially open loop. The saturated fluid 265 (with high working fluid concentration) is removed via a pump 290 and a pipe 284 from the resorber 280. The fluid is then sprayed or distributed otherwise and brought in close contact with a dry gas stream in a cooling tower 292. The cooling tower consists typically of a means 294 to move air through the tower and the main tower. By losing part of the working fluid, which is taken up by the dry gas stream, the adsorbent fluid cools down (evaporative cooling). The cool adsorbent fluid with lower working fluid concentration is now returned to the resorber 280 via a pipe 286, possibly including a regulating valve 308. This relatively simple resorber effectively rejects the working fluid to a gas stream. In the preferred embodiment of the invention an aqueous LiBr—solution is circulated which rejects water vapor and heat at a low temperature to the atmospheric air in the cooling tower. The heat sink 170 of FIG. 3 is replaced by the gas stream in FIG. 6 (indicated by an arrow). The heat is removed from the resorber by means of latent heat of the working fluid which leaves the cooling tower together with the gas blown through the cooling tower.

In a similar way the desorber 116 of the heat transformer in FIG. 3 is replaced by a desorber 310 which utilizes a working fluid containing liquid from an external source. The external source of liquid supplies liquid to pipe 298. The liquid is heated by the waste heat source 172 to a temperature $T_1$. The liquid then enters the desorber 310 where it is flash-desorbed. Part of the working fluid contained in the liquid is desorbed and leaves the desorber via the pipe 134. The working fluid vapor is then adsorbed in one of the adsorber-generators 102 or 104. The desorbed liquid leaves the desorber 310 through a pipe 296. Due to the flash desorption the liquid returns at a lower temperature than $T_1$ (the waste heat temperature of heat source 172). In effect the desorber utilizes the waste heat for evaporation of working fluid from a liquid. A preferred version of the invention could utilize an industrial salt brine which is used as adsorbent liquid which contains water as a working fluid. After leaving the desorber 310 the liquid can be used in an industrial process, etc. The heat transformer of FIG. 6 has the advantage of a simple layout. Further, direct contact heat transfer is used in the cooling tower. A heat exchanger 176 as in FIG. 3 is not necessary. The remaining part of the heat transformer works in the same way as the heat transformer in FIG. 3.

The resorber (280) is connected to a cooling tower (292) via a pipe (286) and a return pipe (284). The pipe (282) connects the pipe (284) via a regulating valve (308) to the pipe (286). A blower (294) moves a gas with low working fluid concentration through the cooling tower. The pipe (284) includes a pump (290).

The desorber (310) is connected to the source for absorbent fluid with high working fluid concentration via a pipe (298). The pipe (296) returns the cooled absorbent liquid with low working fluid concentration to (e.g.) a chemical process. The heat exchanger (301) in the pipe (298) with the valve (295) is used to heat the absorbent fluid. A pump (302) in the pipe (296) is used for circulating the liquid. The heat exchanger (301) can be heated via the heat exchange element (312) which is connected to the heat source (172) at the temperature $T_1$. Element (312) is connected to the pipes (168) and (166) between the valve arrangement (172) and the heat source (172) via the pipes (314) and (316). Preferably a regulating valve (306) is used at the connection of the pipes (314) and (166). This valve is used to regulate the desorber power. The desorber power is regulated in such a way that the desired output power and temperature are reached in the adsorber/generators.

The preferred version of the heat transformer according to FIG. 6 is:

the use of the resorber (280) with direct contact to a gas stream (open desorber). For example, LiBr solution can be used as absorbent liquid and water as working fluid. The LiBr solution is diluted in the resorber and leaves the resorber with a high concentration of water. Using e.g. a stream of dry air the LiBr solution is then "dried", that means part of the water content is removed in the cooling tower (292). Due to the heat of desorption which is taken from the sensible heat of the solution, the returning LiBr solution with low working fluid concentration is cooler than the solution leaving the resorber.

This procedures has the advantage of very small temperature differences between the air and the returning solution (due to the direct contact heat exchange with evaporation).

The desorber can be operated completely independent of the resorber. E.g., the desorber can use sea water as medium. The use of an open cycle resorber requires a device (182) for removing inert gases from the resorber.

FIG. 7 shows the temperature and pressure in the adsorber/generator of a heat transformer during one cycle, including the internal heat exchange and the pressure equalization step.

Table 2 shows the function of the valves, the valve arrangement (192), the temperature and pressures and the operation of pumps etc.

At the beginning of a cycle the saturated adsorber/generator I (e.g. (102)) is at a point E at a high temperature $T_2$. The working fluid concentration in the solid adsorbent is $x_E$. The second adsorber/generator, II, is at an intermediate temperature $T_1$ at a low working fluid concentration $x_B$.

The internal heat exchange is accomplished with a heat transfer medium, which is pumped in a loop between the adsorber/generators. While container I moves from E to F, container II moves from A to B. During this step the concentration in I and II are constant since the valves (136), (138), (140), (142) are closed and the working fluid content of the adsorber/generators does not change. Therefore the curves E-F and A-B are curves of constant concentration (=isosteres). After the temperature $T_B = T_F$ is reached the heat exchange step is completed. Now the pressure equalization step is carried out. The valve (148) is opened and the pressure between the adsorber/generators I and II is equalized. The temperatures and pressures change from point F to G and from B to C. After the point $p_g = p_c$ is reached the pressure equalization step is complete. The above-described procedure leads to a temperature $T_C$ in container II which is above the final temperature $T_G$ of container I. In special cases the temperature $T_C$ can be equal to greater than $T_2$, the output temperature. The exact path in the pressure-temperature diagram has to be calculated from an energy balance. Due to the pressure drop in container I part of the contained working fluid is desorbed and moves to container I where it is adsorbed. In special cases, pressure in the two containers is still different while the adsorber/generate II has reached the temperature $T_1$ and I has reached the temperature $T_2$. In this case the pressure equalization step can be modified: Heat at temperature $T_1$ can be supplied to adsorber/generator I. The generated working fluid vapor moves to adsorber/generator II, where it is adsorbed and liberates heat at $T_2$ which can be supplied to the user (174) as output heat. When the pressure in both adsorber/generators has reached the same value, the process is continued by the regular adsorption phase in adsorber/generator II and the regeneration phase in adsorber/generator I.

During the adsorption adsorber/generator I moves from C to D. At point D the heat output starts. From point D to E heat is supplied to the user. At the same time adsorber/generator II moves from G to H. At point H the heat input from the source (172) can start. Then II moves from H to A while taking up heat at the temperature $T_1$ from the heat source (172) in the process.

At the points A and E the two Adsorber/generators have reached the same position as before starting the cycle except that they have interchanged the status. The continuation of the cycling follows from the above by interchanging the labels I and II.

The preferred procedure for internal heat exchange is characterized by a heat exchange step (e.g. with a heat transfer loop) which is followed by a pressure equalization step.

Without this procedure the process follows the dashed lines A-I-E-K-A. Instead of producing heat along D-E the heat production is restricted to I-E.

The combined internal heat transfer procedures results in a higher total heat output and in an improvement of the c.o.p. (see the examples).

If the pressure equalization step is left out then the amount of working fluid which is necessary to heat container II from B to C (by adsorption) has to be generated in the desorber. This requires input heat at $T_1$. Thus the input heat is greater without increase of the output heat, which means the c.o.p. is lower.

A pressure equalization step without heat exchange step is less efficient than the combined procedure (see examples).

The cycle shown in FIG. 7 is also referred to in Table 2.

For further reference, the patent application "method and device for pumping heat" filed on even date herewith shall be included.

EXAMPLES

To facilitate a quantitative comparison the c.o.p. and the effective concentration change during heat production (=capacity) per unit mass of dry adsorbent are presented for different cycles:

The following definitions are used:

$$c.o.p. = \frac{\text{sum of output heat per cycle at high temperature } T_2}{\text{sum of input heat per cycle at intermediate temperature } T_1}$$

$$\text{capacity} = \frac{\text{mass of working fluid adsorbed while liberating heat at } T_2}{\text{mass of dry solid adsorbent used in the adsorber/generators}}$$

As adsorbent zeolite Y was used with water as working fluid.

1. Example: Heat transformer with a solid adsorbent in two adsorber generators which are used alternately to adsorb and desorb in opposite phases (e.g. a heat transformer as in FIG. 3, but with condenser and evaporator instead of resorber and desorber).
Pressures: $P_0 = 0.01$ bar; $P_1 = 1$ bar.
Temperatures: $T_0 = 10°$ C.; $T_1 = 100°$ C.; $T_2 = 140°$ C.

(a) for comparison a heat transformer without heat exchanger between the adsorber/generators (DE-OS 30 22 284)

c.o.p. $\frac{Q_2}{Q_1' + Q_1} = 0.52$; capacity = 0.095 pressure temperature path in FIG. 7: A—I—E—K—A (b) like (a) but with internal heat exchange with a heat transfer loop between the adsorber/generators c.o.p. $\frac{Q_2}{Q_1' + Q_1} = 0.56$; capacity = 0.11 pressure temperature path in FIG. 7: A—B—D—E—F
H—A (c) like (a) but with pressure equalization step:

c.o.p. $\frac{Q_2'}{Q_1' + Q_1} = 0.60$; capacity = 0.095 pressure temperature path in FIG. 7; A—L—I—E—M
K—A (d) like (a) both with internal heat exchange by heat transfer loop plus a pressure equalization step:

c.o.p. $\frac{Q_2}{Q_1' + Q_1} = 0.60$; capacity = 0.11 pressure temperature path in FIG. 7: A—B—C—D—E
G—H—A

2. Example: Heat transformer with solid adsorbent in two adsorber/generators which are used alternately in opposite phases in combination with a resorber and a desorber (see e.g. FIG. 3).
Pressure levels: $p_0 = 0.01$ bar; $p_1 1 =$ bar.
Temperatures: $T_0 = 30°$ C. $T_1 = 150°$ C. $T_2 = 220°$ C.
c.o.p. with internal heat exchange and pressure equalization step (like in example 1b) c.o.p. = 0.42; capacity = 0.04.

If the internal heat transfer or the pressure equalization step are left out, the cop and the capacity reduce similarly to Example 1.

SUMMARY OF THE EXAMPLES (1) Internal heat exchange according to the preferred procedure results in an improvement of the c.o.p. by $$\frac{0.6 - 0.56}{0.56} = 7\%$$

and the capacity is improved by $$\frac{0.11 - 0.095}{0.095} = 16\%$$

(2) The use of a resorption-desorption loop results allows the production of heat at more than 200° C. compared to 130° C. in the standard system without raising the pressure. Since an example with extremely high temperature $T_2$ was chosen, the c.o.p. and the capacity are lower than in the standard process with evaporation/condensation.

In summary, the invention concerns a method for transforming heat to a higher temperature and a heat transformer. By supplying heat of intermediate temperature $T_1$ to a solid adsorbent at a low pressure as previously adsorbed working fluid is desorbed from the solid adsorbent. The generated working fluid vapor is transformed to a liquid phase at a lower temperature $T_0$ while releasing the phase change heat. At relatively high pressure, heat is supplied to a liquid phase of the working fluid, which is transformed to the gaseous phase, which is then adsorbed in a solid adsorbent while liberating the heat of adsorption. The process is continued by alternately regenerating/saturating the solid adsorbent. The use of an absorbent fluid for changing the phase of the working fluid allows higher output temperatures and choice of the pressure levels used. An internal heat exchange method is included for the efficient use of the sensible heat of the solid adsorbent in systems with two or more containers with solid adsorbent.

TABLE 1

| Valve conditions, pump conditions, temperatures and pressures in the heat transformer according to FIG. 1 (one adsorber/generator) | | | | | | | | | | | | | | | | | |
|---|---|---|---|---|---|---|---|---|---|---|---|---|---|---|---|---|---|
| phase in the adsorber/ generator (14) | valve conditions | | | | | | | | | | pumps | | | temperature in | | pressure in | |
| | 28 | 30 | 64 | 66 | 48 | 52 | 60 | 62 | 38 | 42 | 26 | 56 | 58 | 14 | 36 | 14 | 36 |
| generator | 0 | 0 | — | — | — | — | 0 | 0 | — | — | 0 | — | 0 | $T_1$ | $T_0$ | $p_0$ | $p_0$ |
| adsorption | — | — | 0 | 0 | 0 | 0 | — | — | 0 | 0 | 0 | 0 | — | $T_2$ | $T_1$ | $p_1$ | $p_1$ |

0 = in use, open
— = not used, closed

TABLE 2

Valve conditions, pump conditions, temperatures and pressures in the heat transformer according to FIG. 3 and 4 with two adsorber/generators an internal heat exchange step an pressure equalization step.

| | | pipe connections | | | | valve conditions | | | | | pump condtions | | | |
|---|---|---|---|---|---|---|---|---|---|---|---|---|---|---|
| | | 158 | 156 | 154 | 160 | 150 | 136 | 138 | 140 | 142 | 152 | 196 | 194 | 184 |
| 1. Generating in (102) + adsorbing in (104) | 162<br>164<br>166<br>168 | x<br>—<br>—<br>— | —<br>x<br>—<br>— | —<br>—<br>x<br>— | —<br>—<br>—<br>x | — | 0 | — | — | 0 | — | 0 | 0 | 0 |
| 2. Internal heat exchange | 158<br>156<br>154<br>160 | —<br>—<br>—<br>— | —<br>—<br>x<br>— | —<br>—<br>—<br>— | x<br>—<br>—<br>— | — | — | — | — | — | 0 | — | — | — |
| 3. Pressure equalization | | | | | | 0 | — | — | — | — | — | — | — | — |
| 4. Adsorption in (102) + generating in (104) | 162<br>164<br>166<br>168 | —<br>—<br>—<br>x | —<br>—<br>x<br>— | —<br>x<br>—<br>— | x<br>—<br>—<br>— | — | — | 0 | 0 | — | — | 0 | 0 | 0 |
| 5. Generating in (104) + adsorbing in (102) | 162<br>164<br>166<br>168 | —<br>—<br>—<br>x | —<br>—<br>x<br>— | —<br>x<br>—<br>— | x<br>—<br>—<br>— | — | — | 0 | 0 | — | — | 0 | 0 | 0 |
| 6...7...8 | follow by exchanging (102) and (104) and the corresponding auxiliary devices in phase 2, 3, 4 | | | | | | | | | | | | | |

| | temperatures | | | | pressures | | | | conc. | | path in FIG. 7 | |
|---|---|---|---|---|---|---|---|---|---|---|---|---|
| | 102 | 104 | 114 | 116 | 102 | 104 | 114 | 116 | 102 | 104 | 102 | 104 |
| 1. Generating in (102) + adsorbing in (104) | $T_1$ ↓ | $T_2$ ↓ | $T_0$ | $T_1$ | $p_H$ ↓ $p_0$ | $p_D$ ↓ $p_1$ | $p_0$ | $p_1$ | $x_H$ ↓ $x_A$ | $x_D$ ↓ $x_E$ | H ↓ A | D ↓ E |
| 2. Internal heat exchange | $T_1$ ↓ $T_B$ | $T_2$ ↓ $T_F$ | $T_0$ | $T_1'$ | $p_0$ ↓ $p_B$ | $p_1$ ↓ $p_F$ | $p_0$ | $p_1$ | $x_A$ ↓ $x_B$ | $x_E$ ↓ $x_F$ | A ↓ B | E ↓ F |
| 3. Pressure equalization | $T_B$ ↓ $T_C$ | $T_F$ ↓ $T_G$ | $T_0$ | $T_1'$ | $p_B$ ↓ $p_C$ | $p_F$ ↓ $p_G$ | $p_0$ | $p_1$ | $x_B$ ↓ $x_C$ | $x_F$ ↓ $x_G$ | B ↓ C | F ↓ G |
| 4. Adsorption in (102) + generating in (104) | $T_C$ ↓ $T_2$ | $T_G$ ↓ $T_1$ | $T_0$ | $T_1'$ | $p_C$ ↓ $p_D$ | $p_H$ ↓ $p_H$ | $p_0$ | $p_1$ | $x_c$ ↓ $x_D$ | $x_G$ ↓ $x_H$ | C ↓ D | G ↓ H |
| 5. Generating in (104) + adsorbing in (102) | $T_2$ ↓ | $T_1$ ↓ | $T_0$ | $T_1'$ | $p_D$ ↓ $p_1$ | $p_H$ ↓ $p_0$ | $p_0$ | $p_1$ | $x_D$ ↓ $x_E$ | $x_H$ ↓ $x_A$ | D ↓ E | H ↓ A |
| 6...7...8 | follow by exchanging (102) and (104) and the corresponding auxiliary devices in phase 2, 3, 4 | | | | | | | | | | | | x = pipes connected
— = not used, connected, closed
0 = in use, open

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed:

1. A method for upgrading the temperature of heat in connection with a heat transformer comprising:

supplying heat at an intermediate temperature $T_1$ to an adsorber/generator containing a solid adsorbent to desorb a working fluid from the solid adsorbent at a working fluid pressure $p_0$;

transforming said working fluid from the vapor to the liquid phase at a lower temperature $I_O$ while liberating heat, transforming the liquid phase of said working fluid to a gaseous phase at a higher working fluid pressure $p_1$ while taking up heat at an intermediate temperature $T_1$;

introducing said gaseous working fluid into a further adsorber/generator containing said solid adsorbent where said gaseous working fluid is adsorbed and liberates heat at a higher temperature $T_2$;

desorbing and adsorbing alternately (and shifted in phase) in the two or more adsorber/generators; and using the adsorbent to change the phase of the working fluid from gas to liquid while liberating heat at low pressure $p_O$ and low temperature $T_o$ and an adsorbent fluid which takes up heat and changes the phase of the working fluid from liquid to gaseous at a higher working fluid pressure $p_1$ and at the intermediate temperature $T_1$.

2. The method of claim 1, wherein said method comprises using a solid adsorbent selected from the group consisting of zeolite and activated carbon.

3. The method of claim 1, wherein said method comprises using a working fluid selected from the group consisting of water and methanol.

4. The method of claim 2, wherein said method further comprises using as an adsorbent liquid, an aqueous salt solution selected from the group consisting of LiBr, LiCl, CaCl, Zn Br and mixtures thereof, for changing the phase of said working fluid in at least one of said adsorber/generators.

5. The method of claim 1, wherein said method further comprises during desorption from said solid adsorbent, at given temperatures $T_2$ and $T_1$, reducing the pressure of said working fluid to a pressure $p_1$ which is low enough to permit the use of the selected adsorbent for a certain number of cycles without deterioration of the adsorbent quality of the selected adsorbent.

6. The method according to claim 5, wherein said method further comprises using a maximum working fluid pressure of 1 bar absolute and adsorber/generators having thin walls which are supported against outside pressure by the solid adsorbent inside.

7. The method of claim 1, wherein said method further comprises modifying the working fluid pressures $p_0$ and $p_1$ by adjusting the working fluid concentration in at least one adsorbent liquid such that maximization of adsorbed working fluid mass per adsorption cycle is achieved for given temperatures $T_0$, $T_1$, $T_2$.

8. The method of claim 1, wherein said method further comprises using two independent adsorbent fluids in said adsorber/generators, to change the phase of said working fluid, where the first adsorbent liquid is heated at intermediate temperature $T_1$ before or while desorbing working fluid from said first adsorbent liquid at a pressure $p_1$, while the second adsorbent liquid is cooled at a lower temperature $T_0$ while or after said second adsorbent liquid adsorbs said working fluid at a lower pressure $p_0$.

9. The method of claim 8, wherein said method further comprises using at least one of said first and second adsorbent liquids in a chemical process, in which at least one of heat transference and solution concentration or dilution, occurs.

10. The method of claim 1, wherein said method further comprises after completion of the adsorption and desorption phase, exchanging heat between two or more adsorber/generators.

11. The method of claim 1, wherein said method further comprises equalizing the pressure between at least two of said adsorber/generators being in opposite phases of operation, wherein said working fluid is desorbed in the adsorber/generator(s) being at a relatively higher pressure, and said working fluid is adsorbed in the adsorber/generator(s) being at a relatively lower pressure.

12. The method of claim 1, wherein said method further comprises, exchanging heat between two or more adsorber/generators after completion of the adsorption and desorption phase, and then equalizing the pressure between at least two of said adsorber/generators being in opposite phases of operation, wherein said working fluid is desorbed in the adsorber/generator(s) being at a relatively higher pressure, and said working fluid is adsorbed in the adsorber/generator(s) being at a relatively higher pressure.

13. The method of claim 11, wherein said method further comprises during at least part of the pressure equalization step, at least one of producing in an adsorber/generator with low working fluid concentration, output heat at a temperature $T_2$ or greater, and taking up in an adsorber/generator with high working fluid concentration, heat at or below the intermediate temperature $T_1$.

14. The method of claim 1, wherein said method further comprises during the adsorption phase in said solid absorbent, directing the working fluid vapor flow to be opposite the direction of a heat transfer medium flowing in a heat exchanger embedded in said adsorbent.

15. The method of claim 1, wherein said method further comprises removing gases other than the working fluid vapor from a resorber of said heat transformer.

16. The method of claim 1, wherein said method further comprises externally exchanging heat with the adsorbent liquids/liquids used in containers of said heat transformer for changing the phase of said working fluid.

17. The method of claim 1, wherein said method further comprises contacting in a counter flow manner in a cooling tower, said absorbent liquid having a high working fluid concentration and a stream of gas having a low working fluid concentration, said absorbent liquid liberating working fluid vapor to said stream of gas, and returning said absorbent liquid to the resorber of said heat transformer with a lower working fluid concentration.

18. The method of claim 1, wherein said method further comprises operating in a parallel manner, several adsorber/generators, storing in tanks, the necessary amounts of absorbent liquid with low working fluid concentration for the operations of a resorber of said heat transformer during adsorption of said working fluid in said adsorber/generators, and storing in tanks, the necessary amounts of absorbent liquid with high working fluid concentration for the operations of the desorber during desorption of said working fluid in said adsorber/generators.

19. The method of claim 1, wherein said method further comprises regulating the temperature of a container of said heat transformer for changing the phase of the working fluid at a higher working fluid pressure $p_1$ (the desorber or evaporator), which regulates the power output in the adsorber/generator at the upper temperature $T_2$.

20. The method of claim 1, wherein said method further comprises using a section of a heat exchanger in the adsorber/generators, during the adsorption and/or desorption phase.

21. The method of claim 1, wherein said method further comprises subjecting subdivided sections of said adsorber/generators, to different working fluid pressures, during the adsorption and/or desorption phase.

22. The method of claim 1, wherein said method further comprises, during the adsorption phase in the solid adsorbent contained in the adsorber/generator being connected to a resorber of said heat transformer, emptying at least one said resorber of absorbent liquid.

23. A method for upgrading the temperature of heat in connection with a heat transformer comprising:

supplying heat at an intermediate temperature $T_1$ to an adsorber/generator containing a solid adsorbent to desorb a working fluid from the solid adsorbent at a working fluid pressure $p_0$;

transforming said working fluid from the vapor to the liquid phase at a temperature $T_o$ while liberating heat, transforming the liquid phase of said working fluid to a gaseous phase at a higher working fluid pressure $p_1$ while taking up heat at an intermediate temperature $T_1$;

introducing said gaseous working fluid into a further adsorber/generator containing said solid adsorbent where said gaseous working fluid is adsorbed and liberates heat at a higher temperature $T_2$;

desorbing and adsorbing alternately (and shifted in phase) in the two or more adsorber/generators; and using an adsorbent fluid which takes up heat and changes the phase of the working fluid from liquid to gaseous at a higher working fluid pressure $p_1$ and at the intermediate temperature $T_1$.

24. A method for upgrading the temperature of heat in connection with a heat transformer comprising:

supplying heat at an intermediate temperature $T_1$ to an adsorber/generator containing a solid adsorbent to desorb a working fluid from the solid adsorbent at a working fluid pressure $p_0$;

transforming said working fluid from the vapor to the liquid phase at a temperature $T_o$ while liberating heat, transforming the liquid phase of said working fluid to a gaseous phase at a higher working fluid pressure $p_1$ while taking up heat at an intermediate temperature $T_1$;

introducing said gaseous working fluid into a further adsorber/generator containing said solid adsorbent where said gaseous working fluid is adsorbed and liberates heat at a higher temperature $T_2$;

desorbing and adsorbing alternately (and shifted in phase) in the two or more adsorber/generators; and using the adsorbent to change the phase of the working fluid from gas to liquid while liberating heat at low pressure $p_O$ and low temperature $T_o$.

* * * * *

UNITED STATES PATENT AND TRADEMARK OFFICE
CERTIFICATE OF CORRECTION

PATENT NO. : 4,754,805

DATED : July 5, 1988

INVENTOR(S) : Rothmeyer

It is certified that error appears in the above-identified patent and that said Letters Patent is hereby corrected as shown below:

Col. 1, line 46, after "called", change "absorbe"
to --absorber--.

Col. 1, line 49, after "by", change "mans"
to --means--.

Col. 4, line 5, after "of", change "freedo"
to --freedom--.

Col. 6, line 51, after "medium", change "coing"
to --coming--.

Col. 10, line 15, after "higher", change "temperatre"
to --temperature--.

Col. 12, line 61, after "that", change "th"
to --the--.

UNITED STATES PATENT AND TRADEMARK OFFICE
CERTIFICATE OF CORRECTION

PATENT NO. : 4,754,805

DATED : July 5, 1988

INVENTOR(S) : Rothmeyer

It is certified that error appears in the above-identified patent and that said Letters Patent is hereby corrected as shown below:

Col. 13, line 34, after "after", change "cmpleting" to --completing--.

Col. 13, line 45, after "hotter", change "adsorber/genrator" to -- adsorber/generator--.

Col. 13, line 46, before "is", change "Prefrred" to --Preferred--.

Col. 13, line 47, before "(154)", change "pies" to --pipes--.

Col. 13, line 55, after "exchanger", change "176)" to --(176)--.

Col. 13, line 65, before "of", change "voume" to --volume--.

Col. 13, line 65, after "vapor", change "moing" to --moving--.

Col. 13, line 68, before "in", change "inorporated" to --incorporated--.

Col. 14, line 6, after "exchangers", change "106) to --(106--.

UNITED STATES PATENT AND TRADEMARK OFFICE
CERTIFICATE OF CORRECTION

PATENT NO. : 4,754,805

DATED : July 5, 1988

INVENTOR(S) : Rothmeyer

It is certified that error appears in the above-identified patent and that said Letters Patent is hereby corrected as shown below:

Col. 14, line 9, after "in", change "able" to --Table--.

Col. 15, line 68, after "(266)", insert --.--.

Col. 16, line 3, after "or", change "110)" to --(110)--.

Col. 21, line 61, after "temperature", change "$I_o$" to --$T_o$--.

Col. 24, line 26, after "with the", change "adsorbent" to --absorbent--.

Signed and Sealed this

Twenty-fourth Day of January, 1989

Attest:

DONALD J. QUIGG

*Attesting Officer*      *Commissioner of Patents and Trademarks*